(No Model.)
H. P. STICHTER.
WATER COOLER.
No. 244,086. Patented July 12, 1881.
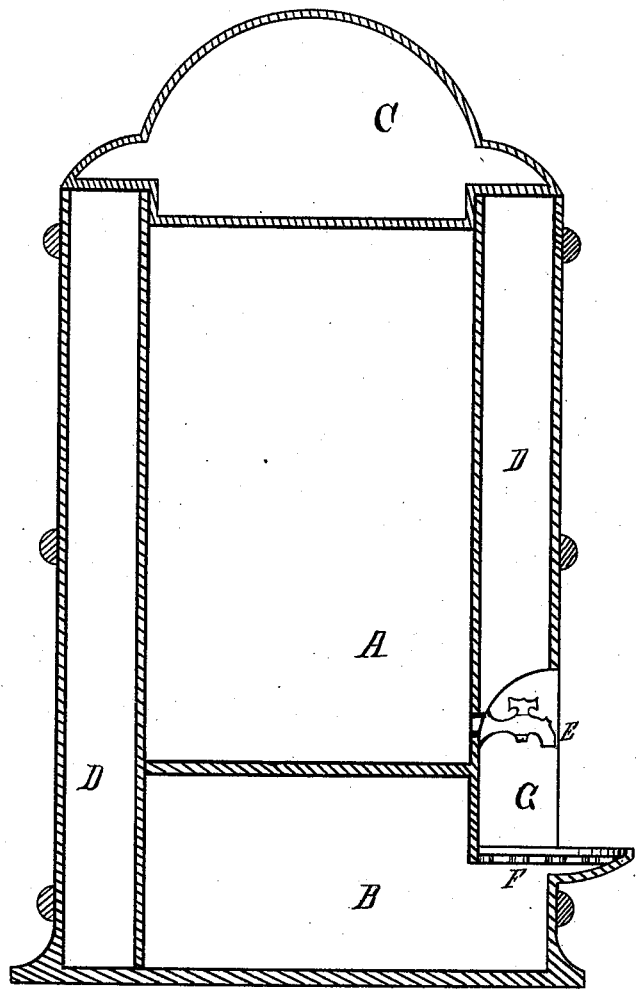
ATTEST:
INVENTOR:
Henry P. Stichter.
By Horace P. McCool.
Attorney.

UNITED STATES PATENT OFFICE.

HENRY P. STICHTER, OF POTTSVILLE, PENNSYLVANIA.

WATER-COOLER.

SPECIFICATION forming part of Letters Patent No. 244,086, dated July 12, 1881.

Application filed July 22, 1880. (No model.)

*To all whom it may concern:*

Be it known that I, HENRY P. STICHTER, of Pottsville, in the county of Schuylkill and State of Pennsylvania, have invented a new and useful Improvement in Water-Coolers, of which the following is a specification.

My invention relates to water-coolers used for holding ice-water and other liquids; and the object of my invention is to prevent the waste water and drips from being scattered over and soiling the floor and space surrounding the cooler.

I attain my object by the device illustrated in the accompanying drawing, which represents a water-cooler with my improvement, and in which—

A is the receptacle for the water and ice; B, a reservoir for holding the waste water; C, the lid covering A; D D, a space surrounding A, sometimes filled with charcoal or similar substances; E, a faucet or cock for drawing water from A; F, a strainer having openings communicating with the reservoir B, and G a recessed space formed so that the cock and a tumbler or other vessel may be placed in it.

As water-coolers are usually made no provision is made for catching the waste water, and in consequence the space surrounding the cooler is generally in a wet and untidy condition. Should the cock leak, or by accident be left partially opened, the water will run on the floor.

The use of my improvement obviates all these inconveniences and disadvantages. By setting the cock back in the recess, as shown in the drawing, and constructing the strainer F so that it projects beyond the outside of the cooler body, I have a neat and tasteful device which accomplishes effectively the object of my invention.

The cock, being recessed, is protected from injury, and the strainer F forms a stand on which to rest a tumbler or other vessel while drawing water. When the reservoir B is filled with waste water it can be readily emptied by tilting the cooler or with a siphon.

In some cases, where coolers are fixed permanently, a cock or other outlet can be attached to the reservoir B.

What I claim is—

In a water-cooler, the combination, substantially as herein shown and described, of the reservoir B, the cock E, the strainer F, the recess G, the water-receptacle A, and lid C.

HENRY P. STICHTER.

Witnesses:
JOSEPH SHELLY,
MORGAN REED.